(12) United States Patent
Liu et al.

(10) Patent No.: US 10,399,160 B2
(45) Date of Patent: Sep. 3, 2019

(54) WHEEL FRONT BURR REMOVING DEVICE

(71) Applicant: CITIC Dicastal CO., LTD, Qinhuangdao (CN)

(72) Inventors: Huiying Liu, Qinhuangdao (CN); Yuexin Lu, Qinhuangdao (CN); Zhiyuan Yu, Qinhuangdao (CN); Xinyu Bi, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 146 days.

(21) Appl. No.: 15/803,122

(22) Filed: Nov. 3, 2017

(65) Prior Publication Data
US 2019/0022777 A1    Jan. 24, 2019

(30) Foreign Application Priority Data
Jul. 21, 2017    (CN) .......................... 2017 1 0598295

(51) Int. Cl.
| | |
|---|---|
| *B23B 5/28* | (2006.01) |
| *B23D 79/02* | (2006.01) |
| *B23Q 5/36* | (2006.01) |
| *B23B 5/16* | (2006.01) |
| *B60B 21/00* | (2006.01) |
| *B23B 9/08* | (2006.01) |
| *B23Q 39/04* | (2006.01) |

(52) U.S. Cl.
CPC ................ *B23D 79/02* (2013.01); *B23B 5/16* (2013.01); *B23B 5/28* (2013.01); *B23Q 5/36* (2013.01); *B23B 9/08* (2013.01); *B23B 2215/08* (2013.01); *B23B 2220/08* (2013.01); *B23Q 39/04* (2013.01); *B60B 21/00* (2013.01); *Y10T 29/5128* (2015.01)

(58) Field of Classification Search
CPC ............. Y10T 29/5127; Y10T 29/5128; Y10T 29/5129; B23B 9/08; B23B 2215/08; B23B 2220/04; B23B 2220/08; B23B 5/16; B23B 5/28; B60B 21/00; B23Q 39/04; B23Q 39/042; B23Q 39/044; B23Q 39/046; B23Q 5/36
See application file for complete search history.

(56) References Cited

U.S. PATENT DOCUMENTS 3,746,459 A * 7/1973 Kindelan ................ B23B 39/22
408/37
3,951,563 A * 4/1976 Ravenhall .............. G01B 7/315
408/1 R (Continued)

FOREIGN PATENT DOCUMENTS

| CN | 202877657 U | * | 4/2013 |
| CN | 103658831 A | * | 3/2014 |

*Primary Examiner* — Sunil K Singh
*Assistant Examiner* — Yasir A Diab
(74) *Attorney, Agent, or Firm* — Calfee, Halter & Griswold LLP

(57) ABSTRACT

Disclosed is a wheel front burr removing device, comprising an upper servo motor, a right support plate, a right slide plate, right guide rails, a right cylinder I, a right cylinder II, a right driven conical friction wheel, a rim burr cutter, a right workbench, a right shaft, a mandrel and the like. Rim burrs are removed on the right station while cap section burrs are removed on the left station, double stations are adopted for machining, so the efficiency is very high.

4 Claims, 2 Drawing Sheets

(56) References Cited

U.S. PATENT DOCUMENTS

| | | | | |
|---|---|---|---|---|
| 4,520,595 | A * | 6/1985 | Diener | B23Q 1/0009 29/38 C |
| 5,720,088 | A * | 2/1998 | Riello | B23Q 39/04 29/38 A |
| 6,926,593 | B1 * | 8/2005 | Carroll | B24B 9/04 451/358 |
| 2004/0170769 | A1 * | 9/2004 | Gatton | B23B 5/02 427/402 |
| 2006/0042091 | A1 * | 3/2006 | Luschei | B23B 1/00 29/894.35 |
| 2011/0068544 | A1 * | 3/2011 | Prust | B23B 31/16275 279/4.02 |
| 2014/0150243 | A1 * | 6/2014 | Mamczur | B23B 5/28 29/527.4 |
| 2015/0273588 | A1 * | 10/2015 | Bowen | B23B 5/28 82/104 |
| 2015/0273595 | A1 * | 10/2015 | Xue | B23B 47/281 408/97 |
| 2016/0052067 | A1 * | 2/2016 | Stricklen | B23B 39/161 408/1 BD |

* cited by examiner

WHEEL FRONT BURR REMOVING DEVICE

CROSS-REFERENCE TO RELATED APPLICATIONS

This application claims priority to Chinese Patent Application No. 2017105982950, filed on Jul. 21, 2017, which is hereby incorporated by reference in its entirety.

TECHNICAL FIELD

The present application relates to the technical field of burr cleaning, specifically to a device for removing burrs from the front rim and cap section of a wheel.

BACKGROUND ART

For an aluminum wheel of a full coating process, the front side is often cast, the remaining parts are turned by machining, thus, the front rim of the wheel has a joint of machining and casting, and a ring of sharp-angled burrs is shown at the joint. Similarly, the front side of a cap section is cast, the depth is turned by machining, and a ring of sharp-angled burrs also remains at the joint of casting and machining. The burrs at the two positions are main burrs on the front side of the wheel after machining, and must be removed. At present, the burrs at the rim and the cap section are mostly manually removed, the roundness of the rim and the cap section is difficult to guarantee after removal in the presence of a circle of burrs, besides, the uniformity of removal is difficult to guarantee since the magnitude of force during manual removal is changed, and the risk of missing scraping the burrs also exists.

SUMMARY OF THE INVENTION

The aim of the present application is to provide a device for removing burrs from the front rim and cap section of a wheel after machining.

In order to fulfill the above aim, the present application adopts the following technical solution: A wheel front burr removing device comprises a frame, a lifting cylinder, guide posts, a lifting table, guide sleeves, a support frame, a lower servo motor, a bearing seat, a shaft, bearings, a driving conical friction wheel, left guide rails, a left cylinder I, a left slide plate, a cap section burr cutter, a left shaft 16, a left workbench, corner cylinder clamping jaws, a left driven conical friction wheel, a left cylinder II, a left support plate, a rotating support, a rotating shaft, an upper servo motor, a right support plate, a right slide plate, right guide rails, a right cylinder I, a right cylinder II, a right driven conical friction wheel, a rim burr cutter, a right workbench, a right shaft and mandrels.

The lifting cylinder and the four guide posts are fixed at the bottom of the frame, the output end of the lifting cylinder is connected with the lifting table, the four guide sleeves are arranged on the lifting table, and the guide sleeves are matched with the guide posts. The support frame is mounted on the lifting table, the lower servo motor is mounted on the support frame, the shaft is connected with the output end of the lower servo motor via the bearings and the bearing seat, and the driving conical friction wheel is mounted on the shaft. The lower servo motor controls rotation of the driving conical friction wheel, and the lifting cylinder controls lifting of the driving conical friction wheel.

The output end of the upper servo motor is connected with the rotating support via the rotating shaft, and the rotating support is divided into a left station and a right station. The left shaft is mounted at the left station of the rotating support, the left driven conical friction wheel is mounted on the left shaft, the left workbench is mounted at the output end of the left shaft, one of the mandrels and three corner cylinder clamping jaws are mounted on the left workbench, the mandrel achieves a radial positioning effect on a wheel, the end face of the left workbench achieves an axial positioning effect, and the three corner cylinder clamping jaws achieve a clamping effect. The right station of the rotating support is totally the same as the left station, the right shaft is mounted at the right station of the rotating support, the right driven conical friction wheel is mounted on the right shaft, the right workbench is mounted at the output end of the right shaft, one of the mandrels and three corner cylinder clamping jaws are mounted on the right workbench, the mandrel achieves a radial positioning effect on the wheel, the end face of the right workbench achieves an axial positioning effect, and the three corner cylinder clamping jaws achieve a clamping effect. The upper servo motor drives the rotating support to rotate 180 degrees, thus switching the left station and the right station.

The left support plate is mounted at the left upper part of the frame 1, the left cylinder II and the two left guide rails are fixed on the left support plate, the left slide plate is mounted on the left guide rails, and the output end of the left cylinder II is connected with the left slide plate and controls the left slide plate to move up and down. The left cylinder I is mounted on the left slide plate, the cap section burr cutter is mounted at the output end of the left cylinder I, and the cap section burr cutter is used for removing burrs at the cap section of the wheel.

The right support plate is mounted at the right upper part of the frame, the right cylinder II and the two right guide rails are fixed on the right support plate, the right slide plate is mounted on the right guide rails, and the output end of the right cylinder I is connected with the right slide plate and controls the right slide plate to move horizontally. The right cylinder II is mounted on the right slide plate, the rim burr cutter is mounted at the output end of the right cylinder II, and the rim burr cutter is used for removing burrs at the rim of the wheel.

The working process of the device is as follows: firstly, according to the width of a wheel, the right cylinder I is started to drive the right slide plate to move horizontally, and the position of the rim burr cutter is adjusted so that the rim burr cutter is located above burrs at the rim of the wheel. According to the diameter of the cap section of the wheel, the left cylinder II is started to drive the left slide plate to move up and down, and the position of the cap section burr cutter is adjusted, so that the cap section burr cutter is located above the edge of the cap section of the wheel. Then, the machined wheel is mounted onto the right workbench by an operator, the lifting cylinder is started to drive the driving conical friction wheel to ascend, and the driving conical friction wheel simultaneously compresses the left driven conical friction wheel and the right driven conical friction wheel. The lower servo motor is started, the left workbench and the right workbench rotate at a low speed under the action of drive of the friction wheels, the left workbench on which no wheel is mounted in the initial state is idle, and the wheel on the right workbench rotates at a low speed. The right cylinder II controls the rim burr cutter to be fed down till contacting burrs, and the burrs on the rim can be removed after the wheel rotates more than one circle. Then, the driving conical friction wheel stops rotating, moves down and is disengaged from the driven friction wheels.

At the moment, the upper servo motor is started to drive the rotating support to rotate degrees, the wheel on the right workbench turns to left, the left workbench turns to right, and the operator mounts a wheel to be deburred onto the left workbench. Then, the lifting cylinder is started to drive the driving conical friction wheel to ascend, and the driving conical friction wheel simultaneously compresses the left driven conical friction wheel and the right driven conical friction wheel. The lower servo motor is started, and both the left workbench and the right workbench rotate at a low speed under the action of drive of the friction wheels, i.e., the wheel on the left workbench and the wheel on the right workbench rotate at a low speed. The right cylinder II controls the rim burr cutter to be fed down till contacting burrs, at the same time, the left cylinder I drives the cap section burr cutter to be fed till contacting burrs at the cap section, and after the burrs of the wheels on the left station and the right station are removed, the driving conical friction wheel stops rotating, moves down and is disengaged from the driven friction wheels. The upper servo motor is started to drive the rotating support to rotate 180 degrees, the wheel on the right workbench turns to left, the wheel on the left workbench turns to right, and the operator takes the deburred wheel on the right side down and mounts a wheel to be deburred. Then, the friction wheels are restarted to drive, burrs are simultaneously removed from the wheels on the left station and the right station, and recycling like this.

Rim burrs are removed on the right station while cap section burrs are removed on the left station. Double stations are adopted for machining, so the efficiency is very high. After the rim burrs are removed, burrs can be removed from the cap section by switching the stations, so that secondary assembly is avoided and the concentricity of the rim and the cap section is facilitated.

When the width of the wheel and the diameter of the cap section are changed, only the positions of the rim burr cutter and the cap section burr cutter are correspondingly adjusted, so the device has stronger generality and can be used for removing burrs from wheels having different specifications and different cap section diameters. Besides, the device can reduce the labor intensity of workers, improve the roundness of the rim and the cap section and improve the burr removing effect, and has the characteristics of flexible structure, simple operation, stability, high efficiency and the like.

Figure 1:
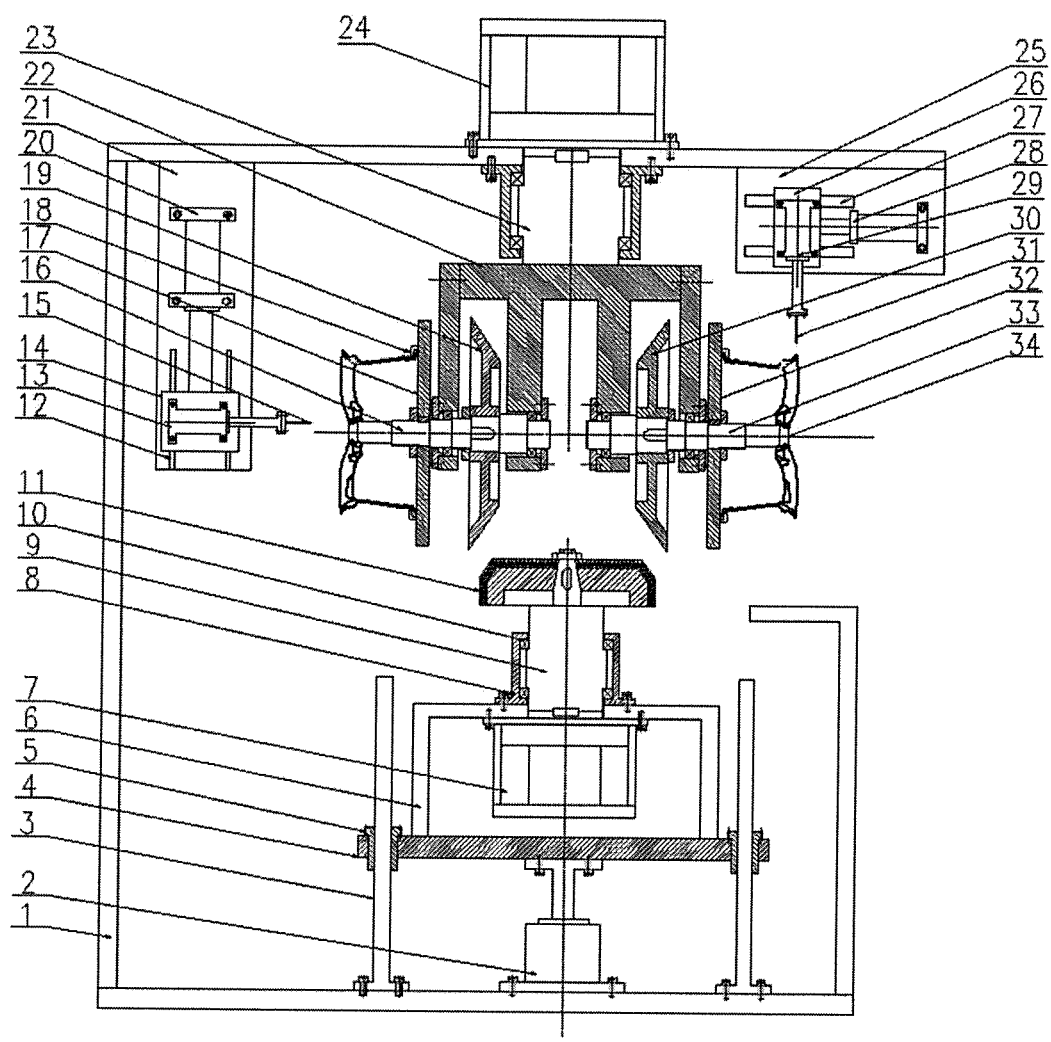
FIG. 1 is a front view of a wheel front burr removing device of the present application.
Figure 2:
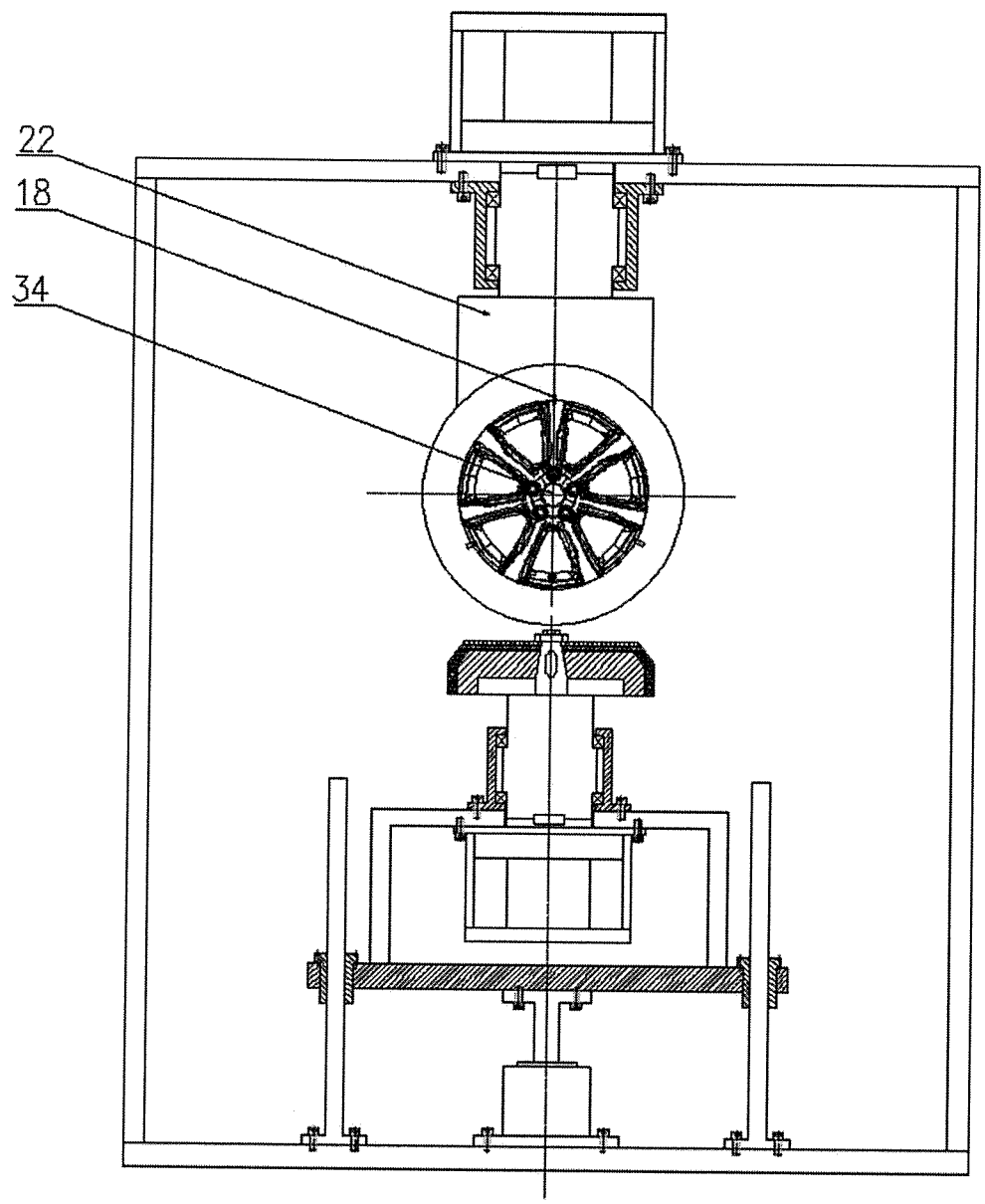
FIG. 2 is a left view of the wheel front burr removing device of the present application.

In figures: 1—frame, 2—lifting cylinder, 3—guide post, 4—lifting table, 5—guide sleeve, 6—support frame, 7—lower servo motor, 8—bearing seat, 9—shaft, 10—bearing, 11—driving conical friction wheel, 12—left guide rail, 13—left cylinder I, 14—left slide plate, 15—cap section burr cutter, 16—left shaft, 17—left workbench, 18—corner cylinder clamping jaw, 19—left driven conical friction wheel, 20—left cylinder II, 21—left support plate, 22—rotating support, 23—rotating shaft, 24—upper servo motor, 25—right support plate, 26—right slide plate, 27—right guide rail, 28—right cylinder I, 29—right cylinder II, 30—right driven conical friction wheel, 31—rim burr cutter, 32—right workbench, 33—right shaft, 34—mandrel.

DETAILED DESCRIPTION OF THE INVENTION

Details and working conditions of a specific device provided by the present application will be given below in combination with the accompanying drawings.

A wheel front burr removing device comprises a frame 1, a lifting cylinder 2, guide posts 3, a lifting table 4, guide sleeves 5, a support frame 6, a lower servo motor 7, a bearing seat 8, a shaft 9, bearings 10, a driving conical friction wheel 11, left guide rails 12, a left cylinder I 13, a left slide plate 14, a cap section burr cutter 15, a left shaft 16, a left workbench 17, corner cylinder clamping jaws 18, a left driven conical friction wheel 19, a left cylinder II 20, a left support plate 21, a rotating support 22, a rotating shaft 23, an upper servo motor 24, a right support plate 25, a right slide plate 26, right guide rails 27, a right cylinder I 28, a right cylinder II 29, a right driven conical friction wheel 30, a rim burr cutter 31, a right workbench 32, a right shaft 33 and mandrels 34.

The lifting cylinder 2 and the four guide posts 3 are fixed at the bottom of the frame 1, the output end of the lifting cylinder 2 is connected with the lifting table 4, the four guide sleeves 5 are arranged on the lifting table 4, and the guide sleeves 5 are matched with the guide posts 3. The support frame 6 is mounted on the lifting table 4, the lower servo motor 7 is mounted on the support frame 6, the shaft 9 is connected with the output end of the lower servo motor 7 via the bearings 10 and the bearing seat 8, and the driving conical friction wheel 11 is mounted on the shaft 9. The lower servo motor 7 controls rotation of the driving conical friction wheel 11, and the lifting cylinder 2 controls lifting of the driving conical friction wheel 11.

The output end of the upper servo motor 24 is connected with the rotating support 22 via the rotating shaft 23, and the rotating support 22 is divided into a left station and a right station. The left shaft 16 is mounted at the left station of the rotating support 22, the left driven conical friction wheel 19 is mounted on the left shaft 16, the left workbench 17 is mounted at the output end of the left shaft 16, the mandrel 34 and three corner cylinder clamping jaws 18 are mounted on the left workbench 17, one of the mandrels 34 achieves a radial positioning effect on a wheel, the end face of the left workbench 17 achieves an axial positioning effect, and the three corner cylinder clamping jaws 18 achieve a clamping effect. The right station of the rotating support 22 is totally the same as the left station, the right shaft 33 is mounted at the right station of the rotating support 22, the right driven conical friction wheel 30 is mounted on the right shaft 33, the right workbench 32 is mounted at the output end of the right shaft 33, one of the mandrels 34 and three corner cylinder clamping jaws 18 are mounted on the right workbench 32, the mandrel 34 achieves a radial positioning effect on the wheel, the end face of the right workbench 32 achieves an axial positioning effect, and the three corner cylinder clamping jaws 18 achieve a clamping effect. The upper servo motor 24 drives the rotating support 22 to rotate 180 degrees, thus switching the left station and the right station.

The left support plate 21 is mounted at the left upper part of the frame 1, the left cylinder II 20 and the two left guide rails 12 are fixed on the left support plate 21, the left slide plate 14 is mounted on the left guide rails 12, and the output end of the left cylinder II 20 is connected with the left slide plate 14 and controls the left slide plate 14 to move up and down. The left cylinder I 13 is mounted on the left slide plate 14, the cap section burr cutter 15 is mounted at the output end of the left cylinder I 13, and the cap section burr cutter 15 is used for removing burrs at the cap section of the wheel.

The right support plate 25 is mounted at the right upper part of the frame 1, the right cylinder II 28 and the two right guide rails 27 are fixed on the right support plate 25, the right slide plate 26 is mounted on the right guide rails 27, and the output end of the right cylinder I 28 is connected with the right slide plate 26 and controls the right slide plate 26 to move horizontally. The right cylinder II 29 is mounted on the right slide plate 26, the rim burr cutter 31 is mounted at the output end of the right cylinder II 29, and the rim burr cutter 31 is used for removing burrs at the rim of the wheel.

The working process of the device is as follows: firstly, according to the width of a wheel, the right cylinder I 28 is started to drive the right slide plate 26 to move horizontally, and the position of the rim burr cutter 31 is adjusted so that the rim burr cutter 31 is located above burrs at the rim of the wheel. According to the diameter of the cap section of the wheel, the left cylinder II 20 is started to drive the left slide plate 14 to move up and down, and the position of the cap section burr cutter 15 is adjusted, so that the cap section burr cutter 15 is located above the edge of the cap section of the wheel. Then, the machined wheel is mounted onto the right workbench 32 by an operator, the lifting cylinder 2 is started to drive the driving conical friction wheel 11 to ascend, and the driving conical friction wheel 11 simultaneously compresses the left driven conical friction wheel 19 and the right driven conical friction wheel 30. The lower servo motor 7 is started, the left workbench 17 and the right workbench 32 rotate at a low speed under the action of drive of the friction wheels, the left workbench 17 on which no wheel is mounted in the initial state is idle, and the wheel on the right workbench 32 rotates at a low speed. The right cylinder II 29 controls the rim burr cutter 31 to be fed down till contacting burrs, and the burrs on the rim can be removed after the wheel rotates more than one circle. Then, the driving conical friction wheel 11 stops rotating, moves down and is disengaged from the driven friction wheels.

At the moment, the upper servo motor 24 is started to drive the rotating support 22 to rotate 180 degrees, the wheel on the right workbench 32 turns to left, the left workbench 17 turns to right, and the operator mounts a wheel to be deburred onto the left workbench 17. Then, the lifting cylinder 2 is started to drive the driving conical friction wheel 11 to ascend, and the driving conical friction wheel 11 simultaneously compresses the left driven conical friction wheel 19 and the right driven conical friction wheel 30. The lower servo motor 7 is started, and both the left workbench 17 and the right workbench 32 rotate at a low speed under the action of drive of the friction wheels, i.e., the wheel on the left workbench 17 and the wheel on the right workbench 32 rotate at a low speed. The right cylinder II 29 controls the rim burr cutter 31 to be fed down till contacting burrs, at the same time, the left cylinder I 13 drives the cap section burr cutter 15 to be fed till contacting burrs at the cap section, and after the burrs of the wheels on the left station and the right station are removed, the driving conical friction wheel 11 stops rotating, moves down and is disengaged from the driven friction wheels. The upper servo motor 24 is started to drive the rotating support 22 to rotate 180 degrees, the wheel on the right workbench 32 turns to left, the wheel on the left workbench 17 turns to right, and the operator takes the deburred wheel on the right side down and mounts a wheel to be deburred. Then, the friction wheels are restarted to drive, burrs are simultaneously removed from the wheels on the left station and the right station, and recycling like this.

Rim burrs are removed on the right station while cap section burrs are removed on the left station. Double stations are adopted for machining, so the efficiency is very high. After the rim burrs are removed, burrs can be removed from the cap section by switching the stations, so that secondary assembly is avoided and the concentricity of the rim and the cap section is facilitated.

When the width of the wheel and the diameter of the cap section are changed, only the positions of the rim burr cutter and the cap section burr cutter are correspondingly adjusted, so the device has stronger generality and can be used for removing burrs from wheels having different specifications and different cap section diameters. Besides, the device can reduce the labor intensity of workers, improve the roundness of the rim and the cap section and improve the burr removing effect, and has the characteristics of flexible structure, simple operation, stability, high efficiency and the like.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel front burr removing device for removing burrs at a cap section or a rim of a wheel, comprising a frame, a lifting cylinder, guide posts, a lifting table, guide sleeves, a support frame, a lower servo motor, a bearing seat, a shaft, bearings, a driving conical friction wheel, left guide rails, a left cylinder I, a left slide plate, a cap section burr cutter, a left shaft, a left workbench, corner cylinder clamping jaws, a left driven conical friction wheel, a left cylinder II, a left support plate, a rotating support, a rotating shaft, an upper servo motor, a right support plate, a right slide plate, right guide rails, a right cylinder I, a right cylinder II, a right driven conical friction wheel, a rim burr cutter, a right workbench, a right shaft and mandrels, characterized in that an output end of the upper servo motor is connected with the rotating support via the rotating shaft, and the rotating support is divided into a left station and a right station; the left shaft is mounted at the left station of the rotating support, the left driven conical friction wheel is mounted on the left shaft, and the left workbench is mounted at the output end of the left shaft; the right station of the rotating support is totally the same as the left station, the right shaft is mounted at the right station of the rotating support, the right driven conical friction wheel is mounted on the right shaft, and the right workbench is mounted at an output end of the right shaft.

2. The wheel front burr removing device of claim 1, wherein the upper servo motor drives the rotating support to rotate 180 degrees, thus switching the left station and the right station.

3. The wheel front burr removing device of claim 1, wherein the left support plate is mounted at the left upper part of the frame, the left cylinder II and the two left guide rails are fixed on the left support plate, the left slide plate is mounted on the left guide rails, and an output end of the left cylinder II is connected with the left slide plate and controls the left slide plate to move up and down; the left cylinder I is mounted on the left slide plate, the cap section burr cutter is mounted at an output end of the left cylinder I, and the cap section burr cutter is used for removing burrs at the cap section of the wheel.

4. The wheel front burr removing device of claim 1, wherein the right support plate is mounted at the right upper part of the frame, the right cylinder II and the two right guide rails are fixed on the right support plate, the right slide plate is mounted on the right guide rails, and an output end of the right cylinder I is connected with the right slide plate and controls the right slide plate to move horizontally; the right cylinder II is mounted on the right slide plate, the rim burr cutter is mounted at an output end of the right cylinder II, and the rim burr cutter is used for removing burrs at the rim of the wheel.

* * * * *